(12) United States Patent
Whitten et al.

(10) Patent No.: US 11,094,182 B2
(45) Date of Patent: Aug. 17, 2021

(54) USING SENSORS TO DETECT MOVEMENT OF LIGHT FIXTURES

(71) Applicant: SIGNIFY HOLDING B.V., Eindhoven (NL)

(72) Inventors: Jonathan Andrew Whitten, Fischers, IN (US); Satinderjeet Kaur, Peachtree City, GA (US); Stephen Paul Kotz, Peachtree City, GA (US); Christopher J. Harris, Hampton, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 98 days.

(21) Appl. No.: 16/529,089

(22) Filed: Aug. 1, 2019

(65) Prior Publication Data

US 2020/0043317 A1 Feb. 6, 2020

Related U.S. Application Data

(60) Provisional application No. 62/713,721, filed on Aug. 2, 2018.

(51) Int. Cl.
| | | |
|---|---|---|
| *G08B 21/18* | (2006.01) | |
| *F21S 8/08* | (2006.01) | |
| *G01C 19/00* | (2013.01) | |
| *G01C 9/18* | (2006.01) | |
| *F21W 131/103* | (2006.01) | |

(52) U.S. Cl.
CPC ........... *G08B 21/182* (2013.01); *F21S 8/086* (2013.01); *F21S 8/088* (2013.01); *F21W 2131/103* (2013.01); *G01C 9/18* (2013.01); *G01C 19/00* (2013.01); *G01C 2009/182* (2013.01)

(58) Field of Classification Search
CPC .... F21S 8/086; F21S 8/088; F21W 2131/103; F21V 23/0492; G01C 19/00; G01C 2009/182; G01C 9/00; G01C 9/18; G08B 21/182

See application file for complete search history.

(56) References Cited

U.S. PATENT DOCUMENTS

| | | | |
|---|---|---|---|
| 7,109,880 B2 | 9/2006 | Sibalich et al. | |
| 2006/0176697 A1 | 8/2006 | Arruda | |
| 2007/0177384 A1 | 8/2007 | Sibalich et al. | |
| 2013/0002489 A1* | 1/2013 | Erad | H01Q 21/29 342/432 |
| 2015/0254570 A1* | 9/2015 | Florence | H05B 47/105 706/52 |
| 2019/0108739 A1* | 4/2019 | Wedig | G08B 29/186 |
| 2020/0208971 A1* | 7/2020 | Lee | F21S 8/085 |
| 2020/0375016 A1* | 11/2020 | Hutson | H05B 47/11 |

\* cited by examiner

*Primary Examiner* — Omeed Alizada

(57) ABSTRACT

A light fixture can include a housing and a sensor device having a sensor that measures at least one parameter associated with a position of the housing. The light fixture can also include a controller coupled to the sensor device. The controller can receive multiple measurements of the at least one parameter taken by the sensor device. The controller can also evaluate each measurement against at least one range of acceptable values. The controller can further send a notification when a measurement falls outside the at least one range of acceptable values. The notification can state that the housing is moved out of position and requires attention.

20 Claims, 9 Drawing Sheets

USING SENSORS TO DETECT MOVEMENT OF LIGHT FIXTURES

CROSS-REFERENCE TO RELATED APPLICATIONS

This application claims priority under 35 U.S.C. § 119 to U.S. Provisional Patent Application Ser. No. 62/713,721, titled "Using Sensors To Detect Movement of Light Fixtures" and filed on Aug. 2, 2018, the entire contents of which are hereby incorporated herein by reference.

TECHNICAL FIELD

The present disclosure relates generally to light fixtures, and more particularly to systems, methods, and devices for detecting movement of light fixtures using sensors.

BACKGROUND

Many light fixtures are mounted to some structure (e.g., a pole). When an issue arises with the structure upon which a light fixture is mounted, some period of time can elapse before the issue is discovered. For example, a parking lot light can be hit by a tree and knocked over during a storm. As another example, a car driving on a freeway can hit a street light, causing the pole to become damaged.

SUMMARY

In general, in one aspect, the disclosure relates to a light fixture that includes a housing and a sensor device having a sensor that measures at least one parameter associated with a position of the housing. The light fixture can also include a controller coupled to the sensor device. The controller can receive multiple measurements of the at least one parameter taken by the sensor device. The controller can also evaluate each measurement against at least one range of acceptable values. The controller can further send a notification when a measurement falls outside the at least one range of acceptable values. The notification can state that the housing is moved out of position and requires attention.

In another aspect, the disclosure can generally relate to a lighting system that includes a first light fixture. The first light fixture can include a first housing and a first sensor device having at least one first sensor that measures at least one parameter associated with a position of the first housing. The first light fixture can also include a controller coupled to the at last one first sensor device. The controller can receive multiple first measurements of the at least one parameter taken by the at least one first sensor device. The controller can also evaluate each first measurement against at least one range of acceptable values. The controller can further send a notification when a first measurement falls outside the at least one range of acceptable values. The notification can state that the first housing is moved out of a first default position and requires attention.

In yet another aspect, the disclosure can generally relate to a sensor device that can include a sensor that measures at least one parameter associated with a position of the sensor. The sensor device can also include a controller coupled to the sensor. The controller can receive multiple measurements of the at least one parameter taken by the sensor device. The controller can also evaluate each measurement against at least one range of acceptable values. The controller can further determine, based on evaluating each measurement, whether a light fixture on which the sensor is disposed is moved out of position. The controller can also send a notification when a measurement falls outside the at least one range of acceptable values. The notification states that a device on which the sensor is disposed is moved out of position and requires attention.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1:
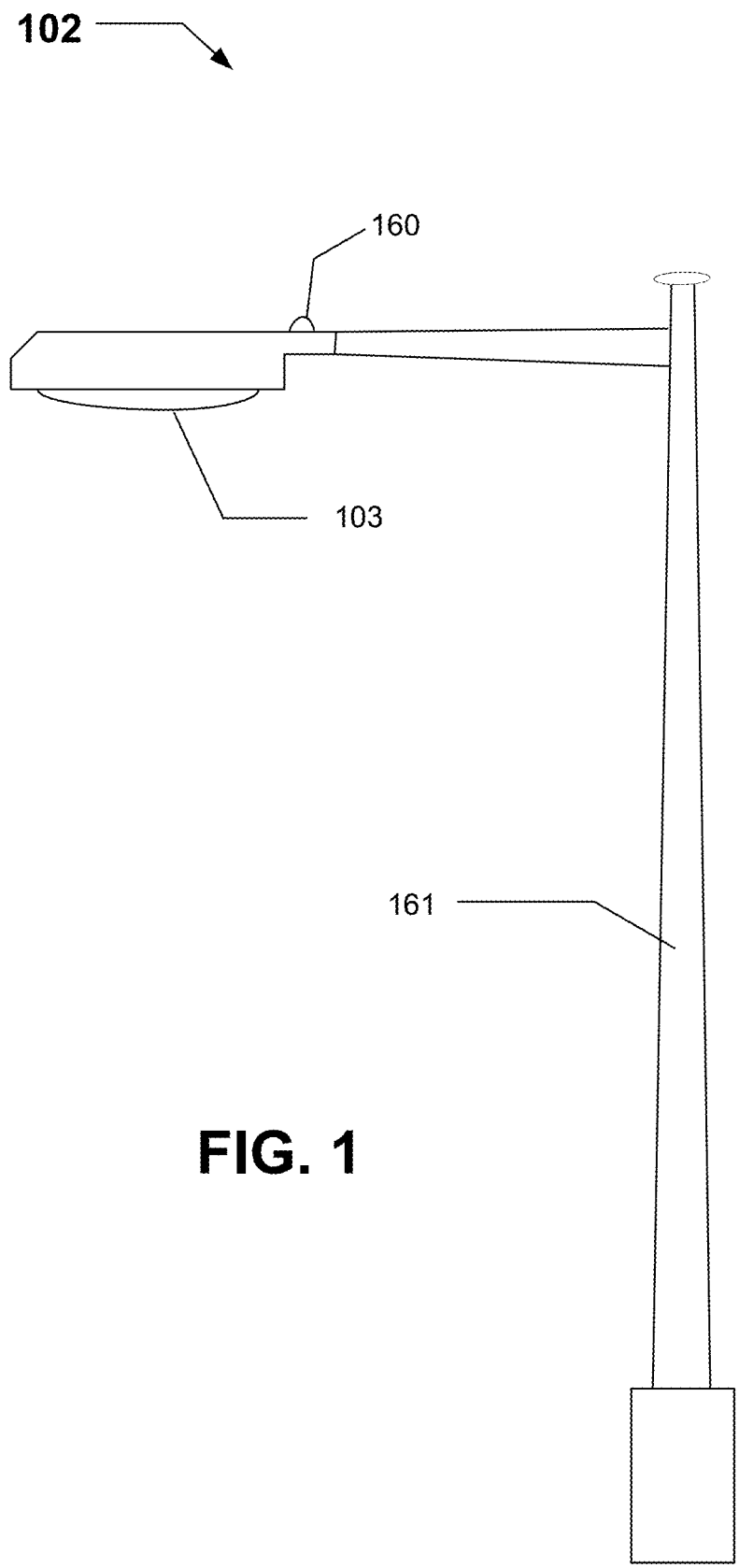
FIGS. 1-3 show light fixtures with sensors in accordance with certain example embodiments.

In general, example embodiments provide systems, methods, and devices for using sensors to detect movement of light fixtures. Example embodiments for using sensors to detect movement of light fixtures provide a number of benefits. Such benefits can include, but are not limited to, increased reliability of a light fixture or a light fixture system, improved safety, more efficient allocation of resources, and compliance with industry standards that apply to light fixtures located in certain environments. Detecting movement of light fixtures can also be applied to detecting extreme weather events or other natural disasters such as earthquakes. Such detection can be useful for providing an early warning system or detecting the severity of an event in a particular area where the light fixtures are located. Example embodiments can be used with new light fixtures or retrofit with existing light fixtures.

Examples of light fixtures that can be used with example embodiments can include, but are not limited to, street lights, traffic lights, stadium lights, spot lights, beacons, floodlights, and emergency egress lights. In some cases, example embodiments can be directed to detecting movement of any type of device, in addition to or aside from light fixtures. Examples of such other devices can include, but are not limited to, security cameras, speakers, support lines, support columns, junction boxes, and shelving units. In other words, example embodiments can be used with any type of electrical and/or mechanical device that is, or is mounted on, some structure (e.g., a pole, a wall, a ceiling, a beam, a column).

Light fixtures that include example embodiments can be located in one or more of any of a number of environments. Examples of such environments can include, but are not limited to, indoors, outdoors, a parking lot, a parking garage, a walkway, a park, a stadium, a sports complex, a highway, a residential street, a freeway or tollway, a manufacturing plant, a warehouse, and a storage facility. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

The example light fixtures that include example embodiments can be made of one or more of a number of suitable materials to allow the light fixture and/or other associated components of a system to meet certain standards and/or regulations while also maintaining durability in light of the one or more conditions under which the light fixtures and/or other associated components of the light fixture can be exposed. Examples of such materials can include, but are not limited to, aluminum, stainless steel, fiberglass, glass, plastic, ceramic, and rubber.

Example light fixtures (or portions thereof) that include example embodiments described herein can be made from a single piece (as from a mold, injection mold, die cast, or extrusion process). In addition, or in the alternative, light fixtures that include example embodiments can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of using sensors to detect movement of light fixtures, one or more of the components shown may be omitted, repeated, and/or substituted. Accordingly, example embodiments of using sensors to detect movement of light fixtures should not be considered limited to the specific arrangements of components shown in any of the figures. For example, features shown in one or more figures or described with respect to one embodiment can be applied to another embodiment associated with a different figure or description.

In certain example embodiments, light fixtures that include example embodiments are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures (e.g., a housing of a light fixture), wiring, and electrical connections. Use of example embodiments described herein meet (and/or allow a corresponding device to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of using sensors to detect movement of light fixtures will be described more fully hereinafter with reference to the accompanying drawings, in which example embodiments of using sensors to detect movement of light fixtures are shown. Using sensors to detect movement of light fixtures may, however, be embodied in many different forms and should not be construed as limited to the example embodiments set forth herein. Rather, these example embodiments are provided so that this disclosure will be thorough and complete, and will fully convey the scope of using sensors to detect movement of light fixtures to those of ordinary skill in the art. Like, but not necessarily the same, elements (also sometimes called components) in the various figures are denoted by like reference numerals for consistency.

Terms such as "first", "second", "above", "below", "distal", "proximal", "end", "top", "bottom", "side", and "within" are used merely to distinguish one component (or part of a component or state of a component) from another. Such terms are not meant to denote a preference or a particular orientation. Such terms are not meant to limit embodiments of using sensors to detect movement of light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figures 2, 3:
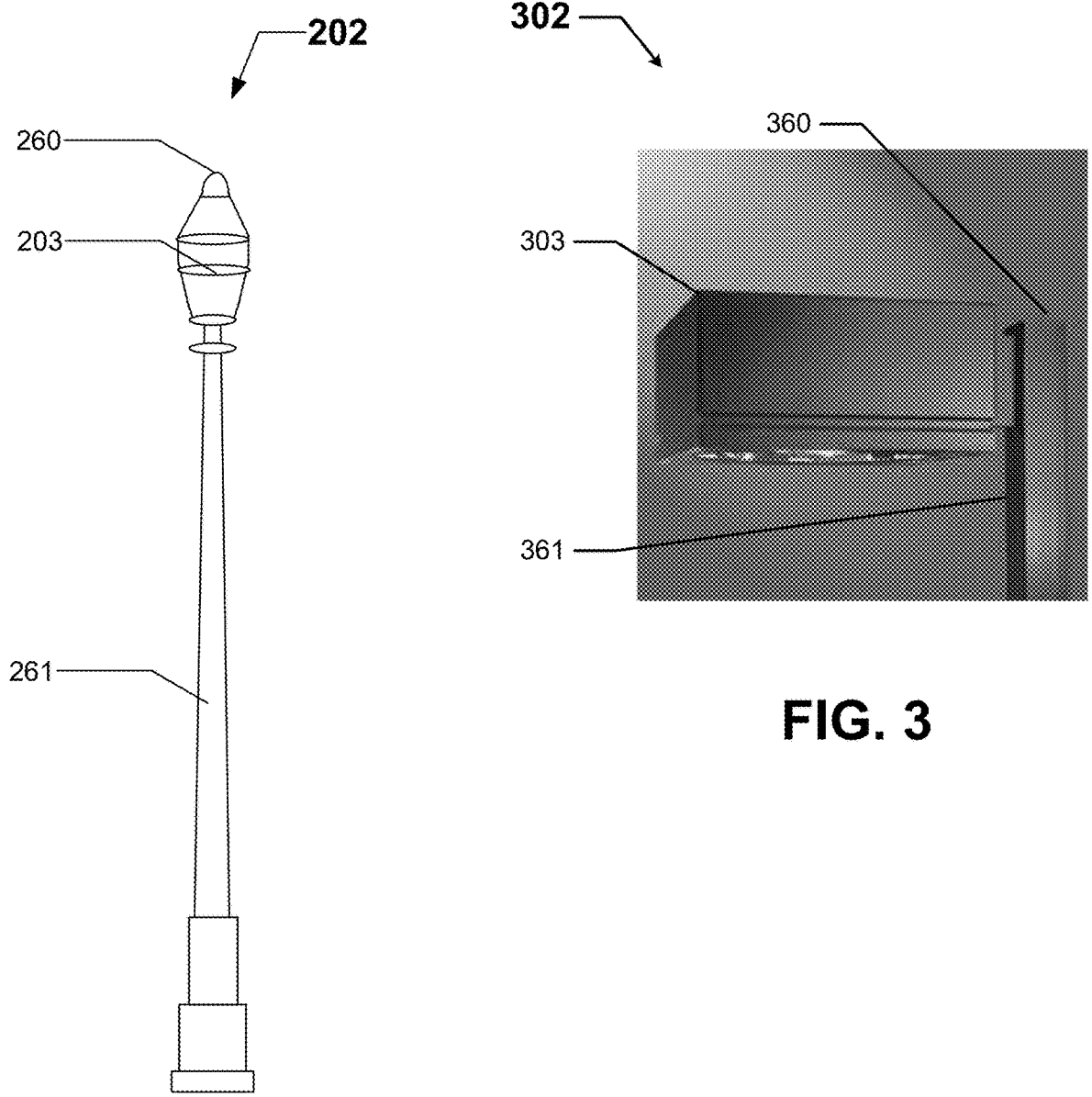

FIGS. 1 through 3 show various light fixtures in accordance with certain example embodiments. Specifically, FIG. 1 shows a street light 102. FIG. 2 shows a light fixture 202 used in a park or walkway. FIG. 3 shows a light fixture 302 used in a parking lot.

The light fixture 102 of FIG. 1 includes a light fixture housing 103 that is mounted on a pole 161. The light fixture housing 103 has a sensor device 160 (discussed below) disposed thereon. In addition, or in the alternative, a sensor device 160 can be disposed within the light fixture housing 103. The light fixture 202 of FIG. 2 includes a light fixture housing 203 that is mounted on top of a pole 261. The light fixture housing 203 has a sensor device 260 (e.g., a photocell) disposed atop thereof. The light fixture 302 of FIG. 3 includes a light fixture housing 303 that is mounted on a pole 361. There is a sensor device 360 (e.g., a photocell) disposed atop the pole 361, proximate to but not directly coupled to the light fixture housing 303.

Figure 4:
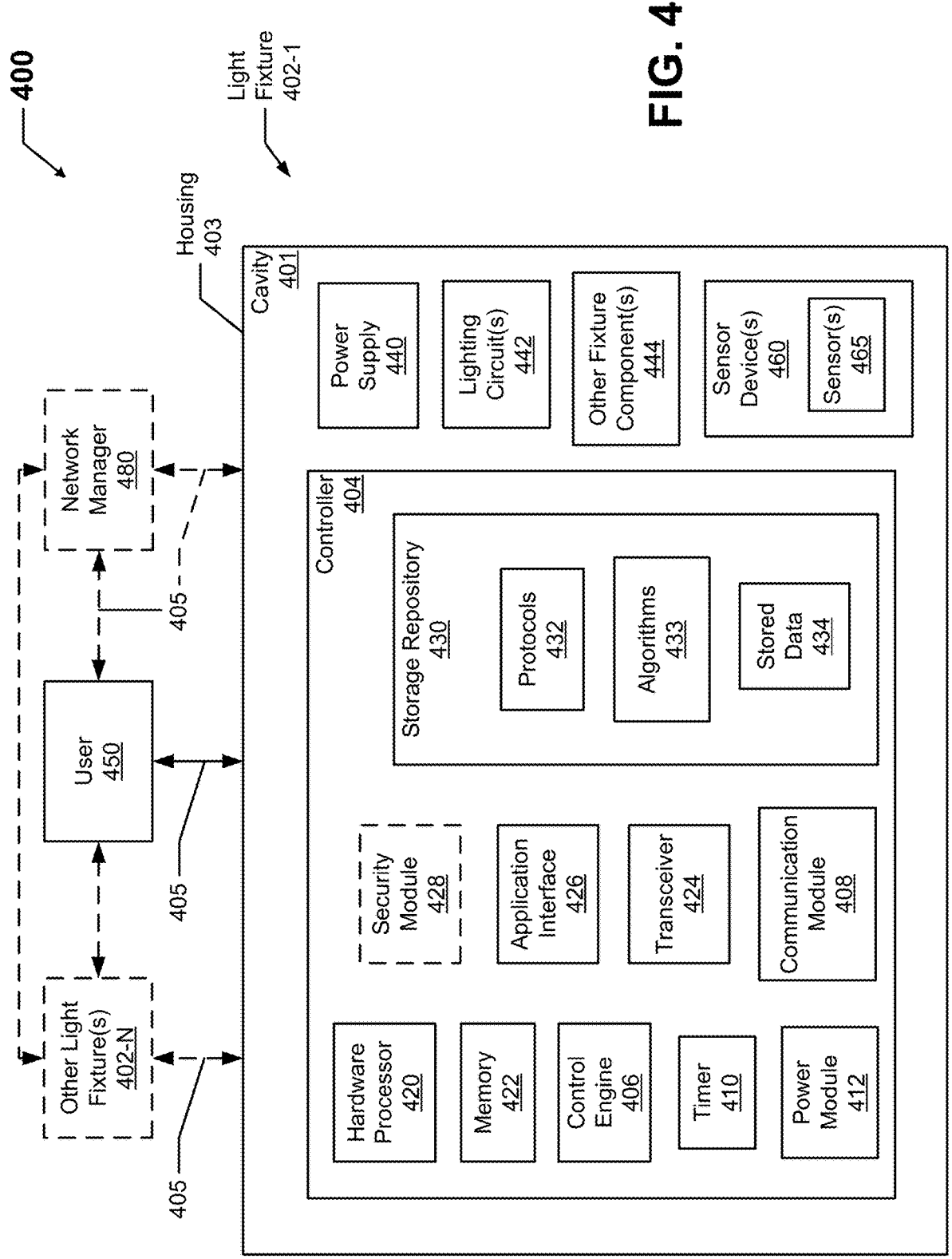
FIG. 4 shows a system diagram of a lighting system that includes a light fixture with a sensor in accordance with certain example embodiments.

FIG. 4 shows a system diagram of a lighting system 400 that includes a light fixture 402-1 (also more generally called a luminaire 402-1) having an example sensor device 460 in accordance with certain example embodiments. In this case, since the light fixture 402-1 has a controller 404, the example sensor device 460 relies upon a number of capabilities of the controller 404 to help the controller 404 determine whether the light fixture 402-1 has experienced significant movement.

The lighting system 400 can include a user 450, an optional network manager 480, the light fixture 402-1, and one or more other optional light fixtures 402-N. In addition to the controller 404, the light fixture 402-1 can include a power supply 440, one or more lighting circuits 442, one or more sensor devices 460, and one or more other fixture components 444. The controller 404 can include one or more of a number of components. Such components, can include, but are not limited to, a control engine 406, a communication module 408, a timer 410, a power module 412, a storage repository 430, a hardware processor 420, a memory 422, a transceiver 424, an application interface 426, and, optionally, a security module 428. As used herein, the light fixture 402-1 and the one or more other light fixtures 402-N can collectively be referred to as the light fixtures 402.

The components shown in FIG. 4 are not exhaustive, and in some embodiments, one or more of the components shown in FIG. 4 may not be included in an example light fixture. Any component of the example light fixture 402-1 can be discrete or combined with one or more other components of the light fixture 402-1.

Referring to FIGS. 1 through 4, a user 450 may be any person that interacts with the light fixtures 402. Examples of a user 450 may include, but are not limited to, an engineer, an electrician, an instrumentation and controls technician, a mechanic, an operator, a property manager, a homeowner, a tenant, an employee, a consultant, a contractor, and a manufacturer's representative. A user 450 can use a user system (not shown), which may include a display (e.g., a GUI). A user 450 can interact with (e.g., sends data to, receives data from) the controller 404 of the light fixture 402-1 via the application interface 426 (described below). A user 450 can also interact with the network manager 480 and the optional other light fixtures 402-N.

Interaction between a user 450, the light fixture 402-1, the optional other light fixtures 402-N, and the network manager 480 can be conducted using communication links 405. Each communication link 405 can include wired (e.g., Class 1 electrical cables, Class 2 electrical cables, electrical connectors) and/or wireless (e.g., Wi-Fi, Zigbee, visible light communication, cellular networking, Bluetooth, WirelessHART, ISA100, Power Line Carrier, RS485, DALI) technology. The communication link 405 can transmit signals (e.g., power signals, communication signals, control signals, data) between the light fixture 402-1, the optional other light fixtures 402-N, a user 450, and the network manager 480.

The optional network manager 480 is a device or component that controls all or a portion of lighting system 400 that includes the controller 404 of the light fixture 402-1, a user 450, and, if applicable, the other light fixtures 402-N in the lighting system 400. The network manager 480 can be substantially similar to the controller 404. Alternatively, the network manager 480 can include one or more of a number of features and/or components in addition to, or altered from, the features and/or components of the controller 404 described below. As described herein, communication with the network manager 480 can include communicating with one or more other components of the system 400. In such a case, the network manager 480 can facilitate such communication.

In some cases, the lighting system 400 of FIG. 4 can include one or more other light fixtures 402-N in addition to light fixture 402-1. In such a case, each of the other light fixtures 402-N can be substantially the same as (or include one or more components that are part of) the light fixture 402-1 described herein. For example, at least one of the other light fixtures 402-N can have one or more of its own sensor devices 460 for determining whether that light fixture 402-N has moved. In some embodiments, one or more components of the light fixture 402-1 described below can be shared with one or more of the other light fixtures 402-N. For example, the controller 404 of the light fixture 402-1 can also control some or all of one or more of the other light fixtures 402-N. Further, the light fixture 402-1, a user 450, and/or the network manager 480 can communicate with one or more of these other light fixtures 402-N using communication links 405 in a similar manner described herein with respect to communications between the light fixture 402-1, a user 450, and the network manager 480.

A user 450 and the network manager 480 can interact with the controller 404 of the light fixture 402-1 using the application interface 426 in accordance with one or more example embodiments. Specifically, the application interface 426 of the controller 404 receives data (e.g., information, communications, instructions, updates to firmware) from and sends data (e.g., information, communications, instructions) to the user 450, the network manager 480, and/or the other light fixtures 402-N. A user 450 and the network manager 480 can include an interface to receive data from and send data to the controller 404 of the light fixture 402-1 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 404, each user 450, and the network manager 480 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 404. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 6.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 400.

Each light fixture 402 (e.g., the light fixture 402-1, one or more of the other light fixtures 402-N) can include a housing 403. The housing 403 can include at least one wall that forms a cavity 401. In some cases, the housing 403 can be designed to comply with any applicable standards so that the light fixture 402 can be located in a particular environment (e.g., outdoors). In some cases, a pole (e.g., pole 161) on which a light fixture 402 is mounted can be considered part of the housing 403. The housing 403 can form any type of light fixture 402, including but not limited to an outdoor light fixture (e.g., a street light, a parking lot light), a troffer light fixture, a down can light fixture, a recessed light fixture, and a pendant light fixture. The housing 403 can also be used to combine the light fixture 402 with some other device, including but not limited to a ceiling fan, a smoke detector, a broken glass detector, a garage door opener, and a wall clock.

The housing 403 of the light fixture 402 can be used to house one or more components of the light fixture 402, including one or more components of the controller 404. For example, the controller 404 (which in this case includes the control engine 406, the communication module 408, the timer 410, the power module 412, the storage repository 430, the hardware processor 420, the memory 422, the transceiver 424, the application interface 426, and the optional security module 428), one or more sensor devices 460, the power supply 440, the lighting circuits 442, and the other fixture components 444 can be disposed in the cavity 401 formed by the housing 403. In alternative embodiments, any one or more of these or other components (e.g., a sensor device 460) of the light fixture 402 can be disposed on the housing 403 and/or remotely from the housing 403.

The storage repository 430 can be a persistent storage device (or set of devices) that stores software and data used to assist the controller 404 in communicating with the user 450 and the network manager 480 (as well as other light fixtures, if any) within the system 400. The software and data stored in the storage repository 430 can also be used to help the controller 404 carry out its various functions, including determining, based on measurements made by one or more of the sensor devices 460, whether the light fixture 402-1 (or portion thereof) has been significantly and permanently moved from its installed position. In one or more example embodiments, the storage repository 430 stores one or more protocols 432, algorithms 433, and stored data 434.

The protocols 432 can include any processes or logic steps that are implemented by the control engine 406 based on certain conditions at a point in time. The protocols 432 can include communication protocols that are used to send and/or receive data between the controller 404, a user 450, and the network manager 480. One or more of the protocols 432 can be a time-synchronized protocol for communications. Examples of such time-synchronized protocols can include, but are not limited to, a highway addressable remote transducer (HART) protocol, a wirelessHART protocol, and an International Society of Automation (ISA) 100 protocol. In this way, one or more of the protocols 432 can provide a layer of security to the data transferred within the system 400.

The algorithms 433 can be any models, formulas, and/or other similar operational implementations that the control engine 406 of the controller 404 uses. An algorithm 433 can at times be used in conjunction with a protocol 432. An example of a protocol 432 is measuring, using a sensor device 460 (for example, the sensor 160 in FIG. 1), an amount of movement and/or a change in orientation of the housing 403 and/or some other portion of the light fixture 402. Another example of a protocol 432 is to send a communication when an amount of movement and/or change in orientation of the light fixture 402 (or portion thereof) exceeds a threshold value.

Yet another example of a protocol 432 is measuring, using one or more sensor devices 460, an amount of movement and/or a change in orientation of one or more other light fixtures 402. Still another of a protocol 432 is to send a communication when an amount of movement and/or change in orientation of one or more other light fixtures 402 exceeds a threshold value. Yet another example of a protocol 432 is determining whether an amount of movement and/or change in orientation of a light fixture 402 is permanent or temporary.

An example of an algorithm 433 can include a formula or model that uses measurements made by one or more of the sensor devices 460 of a light fixture 402 and compares those measurements (or results of calculations made using those measurements) with threshold values (part of the stored data 434). A protocol 432 can then be used to determine whether the control engine 406 should generate a notification (e.g., to a user 450, to another light fixture 402, to the network manager 480) regarding movement of the light fixture 402.

Stored data 434 can be any historical, present, and/or forecast data. Stored data 134 can be associated with a sensor device 460, the lighting circuit 442, the power supply 440, the controller 404, any of the other fixture components 444, the network manager 480, and a user 450. Stored data can be associated with the light fixture 402-1 and/or one or more of the other light fixtures 402-N. Such stored data 434 can include, but is not limited to, settings, threshold values, default values, user preferences, results of an algorithm, capabilities of a lighting circuit 442, a manufacturer of a sensor device 460, a model number of a sensor device 460, and measurements taken by the sensor device 460.

Examples of a storage repository 430 can include, but are not limited to, a database (or a number of databases), a file system, a hard drive, flash memory, cloud-based storage, some other form of solid state data storage, or any suitable combination thereof. The storage repository 430 can be located on multiple physical machines, each storing all or a portion of the protocols 432, the algorithms 433, and/or the stored data 434 according to some example embodiments. Each storage unit or device of the storage repository 430 can be physically located in the same or in a different geographic location.

The storage repository 430 can be operatively connected to the control engine 406. In one or more example embodiments, the control engine 406 includes functionality to communicate with a user 450, the network manager 480, and any other light fixtures 402-N that may exist in the lighting system 400. More specifically, the control engine 406 sends information to and/or receives information from the storage repository 430 in order to communicate with a user 450, the network manager 480, and any other light fixtures 402-N that may exist in the lighting system 400. As discussed below, the storage repository 430 can also be operatively connected to the communication module 408 in certain example embodiments.

In certain example embodiments, the control engine 406 of the controller 404 controls the operation of one or more components (e.g., the communication module 408, the timer 410, the transceiver 424) of the controller 404. For example, the control engine 406 can activate the communication module 408 when the communication module 408 is in "sleep" mode and when the communication module 408 is needed to send data received from another component (e.g., a sensor device 460, a user 450) in the system 400. As another example, the control engine 406 can operate one or more sensor devices 460 to dictate when measurements are taken by the sensor devices 460 and when those measurements are communicated by the sensor devices 460 to the control engine 406. As another example, the control engine 406 can acquire the current time using the timer 410. The timer 410 can enable the controller 404 to control the light fixture 402 even when the controller 404 has no communication with the network manager 480.

As another example, the control engine 406 can store configurations of the controller 404 (or portions thereof) in memory 422 (e.g., non-volatile memory) so that the controller 404 (or portions thereof) can operate regardless of whether the controller 404 is communicating with the network manager 480 and/or other components in the system 400. As still another example, the control engine 406 can conduct one or more tests, according to a protocol 432 and/or an algorithm 433, to determine whether movement of the light fixture 402-1 has exceeded one or more threshold values based on measurements made by one or more sensor devices 460.

In certain example embodiments, the control engine 406 can identify and report the cause of movement of one or light fixtures 402, regardless of whether threshold values have been exceeded. For example, the control engine 406 can determine whether a measurement or series of measurements made by a sensor device 460 indicates that the light fixture 402 is swaying due to high winds or subject to an earthquake tremor as opposed to being permanently bent. Such threshold value can be, for example, a plus-or-minus degree of movement, an amount of time that a degree of movement has been sustained, and an amount of movement relative to a default position in a period of time.

The control engine 406 can follow a protocol 432 to control (e.g., when measurements should be taken, how often measurements should be taken, which measurements should be taken) each sensor device 460. As yet another example, the control engine 406 can determine when to communicate with a user 450, the network manager 480, and/or another light fixture 402-N based on whether the control engine 406 has determined, using protocols 432 and/or algorithms 433 in combination with measurements made by one or more sensor devices 460, that the light fixture 402-1 has moved a significant amount and likely requires repair or replacement. In some cases, the control engine 406 can communicate the measurements made by a sensor device 460 to another light fixture 402-N using communication links 405. As still another example, the control engine 406 can cause the controller 404 to operate in an autonomous control mode if one or more components (e.g., the communication module 408, the transceiver 424) of the controller 404 that allows the controller 404 to communicate with another component of the system 400 fails.

The control engine 406 can provide control, communication, and/or other similar signals to a user 450, the network manager 480, and any of the other light fixtures 402-N. Similarly, the control engine 406 can receive control, communication, and/or other similar signals from a user 450, the network manager 480, and any of the other light fixtures 402-N. The control engine 406 can control each sensor device 460 automatically (for example, based on one or more protocols 432 and/or algorithms 433 stored in the storage repository 430) and/or based on control, communication, and/or other similar signals received from another component (e.g., the network manager 480) through a communication link 405. The control engine 406 may include a printed circuit board, upon which the hardware processor 420 and/or one or more discrete components of the controller 404 are positioned.

In certain example embodiments, the control engine 406 can include an interface that enables the control engine 406 to communicate with one or more components (e.g., power supply 440) of the light fixture 402-1. For example, if the power supply 440 of the light fixture 402-1 operates under IEC Standard 62386, then the power supply 440 can include a digital addressable lighting interface (DALI). In such a case, the control engine 406 can also include a DALI to enable communication with the power supply 440 within the light fixture 402-1. Such an interface can operate in conjunction with, or independently of, the protocols 432 used to communicate between the controller 404, a user 450, any other light fixtures 402-N, and the network manager 480.

The control engine 406 (or other components of the controller 404) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 408 of the controller 404 determines and implements the communication protocol (e.g., from the protocols 432 of the storage repository 430) that is used when the control engine 406 communicates with (e.g., sends signals to, receives signals from) a user 450, the network manager 480, any other light fixtures 402-N, and/or one or more of the sensor devices 460. In some cases, the communication module 408 accesses the stored data 434 to determine which protocol 432 is used to communicate with the sensor device 460 associated with the stored data 434. In addition, the communication module 408 can interpret the protocol 432 of a communication received by the controller 404 so that the control engine 406 can interpret the communication.

The communication module 408 can send and receive data between the network manager 480, the users 450, any other light fixtures 402-N, and the controller 404. The communication module 408 can send and/or receive data in a given format that follows a particular protocol 432 for communication. The control engine 406 can interpret the data packet received from the communication module 408 using information about a protocol 432 stored in the storage repository 430. The control engine 406 can also facilitate the data transfer between with the network manager 480, any other light fixtures 402-N, and/or a user 450 by converting the data into a format understood by the communication module 408.

The communication module 408 can send data (e.g., protocols 432, algorithms 433, stored data 434, measurements made by a sensor device 460, operational information, error codes, threshold values, user preferences) directly to and/or retrieve data directly from the storage repository 430. Alternatively, the control engine 406 can facilitate the transfer of data between the communication module 408 and the storage repository 430. The communication module 408 can also provide encryption to data that is sent by the controller 404 and decryption to data that is received by the controller 404. The communication module 408 can also provide one or more of a number of other services with respect to data sent from and received by the controller 404. Such services can include, but are not limited to, data packet routing information and procedures to follow in the event of data interruption.

The timer 410 of the controller 404 can track clock time, intervals of time, an amount of time, and/or any other measure of time. The timer 410 can also count the number of occurrences of an event, whether with or without respect to time. Alternatively, the control engine 406 can perform the counting function. The timer 410 is able to track multiple time measurements concurrently. The timer 410 can track time periods based on an instruction received from the control engine 406, based on an instruction received from the user 450, based on an instruction programmed in the software for the controller 404, based on some other condition or from some other component, or from any combination thereof.

The timer 410 can be configured to track time when there is no power delivered to the controller 404 (e.g., the power module 412 malfunctions) using, for example, a super capacitor or a battery backup. In such a case, when there is a resumption of power delivery to the controller 404, the timer 410 can communicate any aspect of time to the controller 404. In such a case, the timer 410 can include one or more of a number of components (e.g., a super capacitor, an integrated circuit) to perform these functions.

The power module 412 of the controller 404 provides power to one or more other components (e.g., timer 410, control engine 406) of the controller 404. In addition, in certain example embodiments, the power module 412 can provide power (e.g., secondary power) to the power supply 440 of the light fixture 402-1. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412.

The power module 412 can include one or more components (e.g., a transformer, a diode bridge, an inverter, a converter) that receives power (for example, through an electrical cable) from the power supply 440 and/or a source external to the light fixture 402-1. The power module 412 can use this power to generate power of a type (e.g., alternating current, direct current) and level (e.g., 12V, 24V, 120V) that can be used by the other components of the controller 404. In addition, or in the alternative, the power module 412 can be a source of power in itself to provide signals to the other components of the controller 404 and/or the power supply 440. For example, the power module 412 can include a battery or other form of energy storage device. As another example, the power module 412 can include a localized photovoltaic solar power system.

In certain example embodiments, the power module 412 of the controller 404 can also provide power and/or control signals, directly or indirectly, to one or more of the sensor devices 460. In such a case, the control engine 406 can direct the power generated by the power module 412 to the sensor devices 460 and/or the power supply 440 of the light fixture 402-1. In this way, power can be conserved by sending power to the sensor devices 460 and/or the power supply 440 of the light fixture 402-1 when those devices need power, as determined by the control engine 406.

The hardware processor 420 of the controller 404 executes software, algorithms (e.g., algorithms 433), and firmware in accordance with one or more example embodiments. Specifically, the hardware processor 420 can execute software on the control engine 406 or any other portion of the controller 404, as well as software used by a user 450, any other light fixtures 402-N, and/or the network manager 480. The hardware processor 420 can be or include an integrated circuit (IC), a central processing unit, a multi-core processing chip, SoC, a multi-chip module including multiple multi-core processing chips, or other hardware processor in one or more example embodiments. The hardware processor 420 can be known by other names, including but not limited to a computer processor, a microprocessor, and a multi-core processor.

In one or more example embodiments, the hardware processor 420 executes software instructions stored in memory 422. The memory 422 includes one or more cache memories, main memory, and/or any other suitable type of memory. The memory 422 can include volatile and/or non-volatile memory. The memory 422 is discretely located within the controller 404 relative to the hardware processor 420 according to some example embodiments. In certain configurations, the memory 422 can be integrated with the hardware processor 420.

In certain example embodiments, the controller 404 does not include a hardware processor 420. In such a case, the controller 404 can include, as an example, one or more field programmable gate arrays (FPGA), one or more insulated-gate bipolar transistors (IGBTs), and/or one or more ICs. Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices can be used in conjunction with one or more hardware processors 420.

The transceiver 424 of the controller 404 can send and/or receive control and/or communication signals. Specifically, the transceiver 424 can be used to transfer data between the controller 404, a user 450, any other light fixtures 402-N, and the network manager 480. The transceiver 424 can use wired and/or wireless technology. The transceiver 424 can be configured in such a way that the control and/or communication signals sent and/or received by the transceiver 424 can be received and/or sent by another transceiver that is part of a user 450, any other light fixtures 402-N, and/or the network manager 480. The transceiver 424 can use any of a number of signal types, including but not limited to radio frequency signals and visible light signals.

When the transceiver 424 uses wireless technology, any type of wireless technology and/or protocol can be used by the transceiver 424 in sending and receiving signals. Such wireless technologies and/or protocols can include, but are not limited to, Wi-Fi, Zigbee, visible light communication, cellular networking, Bluetooth, and Bluetooth Low Energy. The transceiver 424 can use one or more of any number of suitable protocols 432 (e.g., ISA100, HART) when sending and/or receiving signals. Such communication protocols can be stored in the protocols 432 of the storage repository 430. Further, any transceiver information for a user 450, any other light fixtures 402-N, and the network manager 480 can be part of the protocols 432 (or other areas) of the storage repository 430.

Optionally, in one or more example embodiments, the security module 428 secures interactions between the controller 404, the users 450, any other light fixtures 402-N, and the network manager 480. More specifically, the security module 428 authenticates communication from software based on security keys verifying the identity of the source of the communication. For example, user software may be associated with a security key enabling the software of a user 450 to interact with the controller 404. Further, the security module 428 can restrict receipt of information, requests for information, and/or access to information in some example embodiments.

As mentioned above, aside from the controller 404 and its components, the light fixture 402 can include one or more sensor devices 460, a power supply 440, one or more other fixture components 444, and one or more lighting circuits 442. The lighting circuits 442 of the light fixture 402-1 are devices and/or components typically found in a light fixture to allow the light fixture 402-1 to operate (emit light). For example, a lighting circuit 442 can include one or more light sources that emit light using power provided by the power supply 440. The light fixture 402-1 can have one or more of any number and/or type (e.g., light-emitting diode, incandescent, fluorescent, halogen) of light sources in a lighting circuit 442. A lighting circuit 442 can vary in the amount and/or color of light that it emits. A lighting circuit 442 can be controlled by the controller 404, the power supply 440, and/or another light fixture component 444.

The power supply 440 of the light fixture 402-1 receives power from an external source (e.g., a wall outlet, a circuit breaker, an energy storage device). The power supply 440 uses the power it receives to generate and provide power to the power module 412 of the controller 404, the sensor devices 460, applicable other fixture components 444, and/or one or more of the lighting circuits 442. The power supply 440 can be called by any of a number of other names, including but not limited to a driver, a LED driver, a switchpack, a control module, and a ballast. In some cases, the power supply 440 also sends and receives control signals. The power supply 440 can include one or more of a number of single or multiple discrete components (e.g., transistor, diode, resistor), and/or a microprocessor. The power supply 440 may include a printed circuit board, upon which the microprocessor and/or one or more discrete components are positioned, and/or a dimmer function.

In some cases, the power supply 440 can include one or more components (e.g., a transformer, a diode bridge, an inverter, a converter) that receives power (for example, through an electrical cable) and generates power of a type (e.g., alternating current, direct current) and level (e.g., 12V, 24V, 120V) that can be used by sensor devices 460, any applicable other fixture components 444, the power module 412 of the controller 404, and/or the lighting circuits 442. In addition, or in the alternative, the power supply 440 can be a source of power in itself. For example, the power supply 440 can be or include a battery, a localized photovoltaic solar power system, or some other source of independent power.

The one or more optional other fixture components 444 can include any of a number of components that are part of the light fixture 402-1. Such other fixture components 444 can be electrical, electronic, mechanical, or some combination thereof. Examples of such other fixture components 444 can include, but are not limited to, a controller (which performs functions that are separate from the functions performed by the controller 404), a reflector, a refractor, a baffle, a wave guide, a heat sink, an electrical conductor or electrical cable, a terminal block, a diffuser, an air moving device, a circuit board, an energy storage device (e.g., a battery), a pole, and a lens.

The sensor 465 of each sensor device 460 measures one or more parameters (e.g., position, azimuth, direction, acceleration, vibration, oscillation, signal strength, an angle of a signal sent or received, current, pressure, temperature, carbon monoxide, ambient temperature, humidity, voltage). The sensor 465 of each sensor device 460 can be any type of sensor 465 that measures one or more parameters. Examples of types of sensors 465 of sensor devices 460 can include, but are not limited to, a mercury switch, an accelerometer, a compass, a vibration sensor, an antenna, a resistor, a passive infrared sensor, a photocell, a humidity sensor, a pressure sensor, an air flow monitor, a gas detector, and a resistance temperature detector. The light fixture 402-1 can include one or more sensor devices 460 that are used to directly operate the light fixture 402-1. A sensor device 460 can have one or multiple sensors 465.

In example embodiments, one or more of the sensor devices 460 are used to measure parameters relating to the position (e.g., in two dimensions, in three dimensions) of the light fixture 402-1 and/or one or more of the other light fixtures 402-N. For example, a sensor 465 of a sensor device 460 can be used to measure whether the light fixture 402-1 (or some component thereof, such as the housing 403) is vibrating or oscillating (e.g., during wind gusts or high sustained winds) or is put in a new position (e.g., in two dimensions, in three dimensions), as when a pole (e.g., pole 161) on which the light fixture 402-1 is mounted is bent or broken (e.g., by an automobile striking the pole, by a truck backing into the pole, by a tree falling on or against the pole, by wind blowing against the pole).

As another example, a sensor 465 of a sensor device 460 of the light fixture 402-1 can include an antenna to measure a parameter (e.g., an angle of arrival, a strength of signal (e.g., RSSI)) of a signal sent by another component (e.g., a beacon, another antenna) of one or more of the other light fixture 402-N of the lighting system 400. In this way, a sensor device 460 of the light fixture 402-1 can determine whether one or more adjacent light fixtures 402-N has been knocked over or bent to some significant degree. In such a case, the sensor 465 of the sensor device 460 of the light fixture 402-N can specifically identify which particular adjacent light fixtures 402-N have been damaged. For instance, the signals received by the sensor 465 of the sensor device 460 of the light fixture 402-N can include a UUID of the sending adjacent light fixture 402. As another example, the light fixture 402-1 can include sensors 465 in the form of multiple antennae that can receive the same signal broadcast by another light fixture 402-N, thereby allowing the controller 404 to determine which adjacent light fixture 402-N sent the signal.

In some cases, a combination of sensors 465 or sensor devices 460, each measuring a different parameter, can be used in combination to determine and confirm whether the light fixture 402-1 has moved enough (e.g., falls outside a range of acceptable values) to warrant notification being sent by the controller 404 that one or more of the light fixtures 402 in the system 400 have been damaged. For example, one sensor 465 of the light fixture 402-1 can include a mercury switch that determines movement (e.g., in two dimensions, in three dimensions) of the light fixture 402-1, while another sensor 465 of the light fixture 402-1 can include an antenna that measures an angle at which a signal from an adjacent light fixture 402-N is received. In such a case, the mercury switch indicates a significant movement of the light fixture 402-1, and a significant change in the angle at which a signal from the adjacent light fixture 402-N is received by the antenna can serve as confirmation and/or provide detail as to the current position of the light fixture 402-N relative to its normal position. As an alternative to a mercury switch, a sensor 465 can include, but is not limited to, an accelerometer, a tilt sensor, a magnetometer, and a magnetic field sensor. Each sensor device 460 can use one or more of a number of protocols 432 for operations and/or communication.

As stated above, the light fixture 402-1 can be placed in any of a number of environments. As a result, the housing 403 of the light fixture 402-1 can be configured to comply with applicable standards for any of a number of environments. For example, the light fixture 402-1 can be rated as a Division 1 or a Division 2 enclosure under NEC standards. Similarly, any of the sensor devices 460 or other devices communicably coupled to the light fixture 402-1 can be configured to comply with applicable standards for any of a number of environments. For example, the housing 403 can be rated as a Division 1 or a Division 2 enclosure under NEC standards.

An example sensor device 460 described herein can be a permanent part of the light fixture 402-1. In other words, the sensor device 460 can be hardwired and/or otherwise fixedly attached to some other part (e.g., the housing 403) of the light fixture 402-1. In other cases, an example sensor device 460 can be removably coupled to and/or retrofittable with respect to the light fixture 402-1. For example, a sensor device 460 can be integrated with the rest of the light fixture 402-1 during manufacturing, during installation, or after installation and operation. As another example, the location of the sensor device 460 with respect to the housing 403 of the light fixture 402-1 can vary. In addition, in some cases, the sensor device 460 is configured to have coupling features (e.g., plugs, clamps) that allow the sensor device 460 to be easily replaced by a user 450 after installation if that sensor device 460 fails, malfunctions, or does not have the desired type of sensing device 465.

In certain example embodiments, a sensor device 460 can be configured to provide power from a secondary power source (e.g., a battery) after power from a primary source of power (e.g., the power supply 440, the power module 412 of the controller 404) is interrupted. In this way, the sensor 465 of the sensor device 460 can make one or more measurements after the power from the primary power source is interrupted (e.g., when a pole is hit and the light fixture 402-1 is knocked to the ground) and transmit those measurements to the controller 404. In alternative embodiments, the power module 412 and/or the power supply 440 has the capability to provide power to the sensor device 460 when the primary source of power is interrupted.

Figure 5:
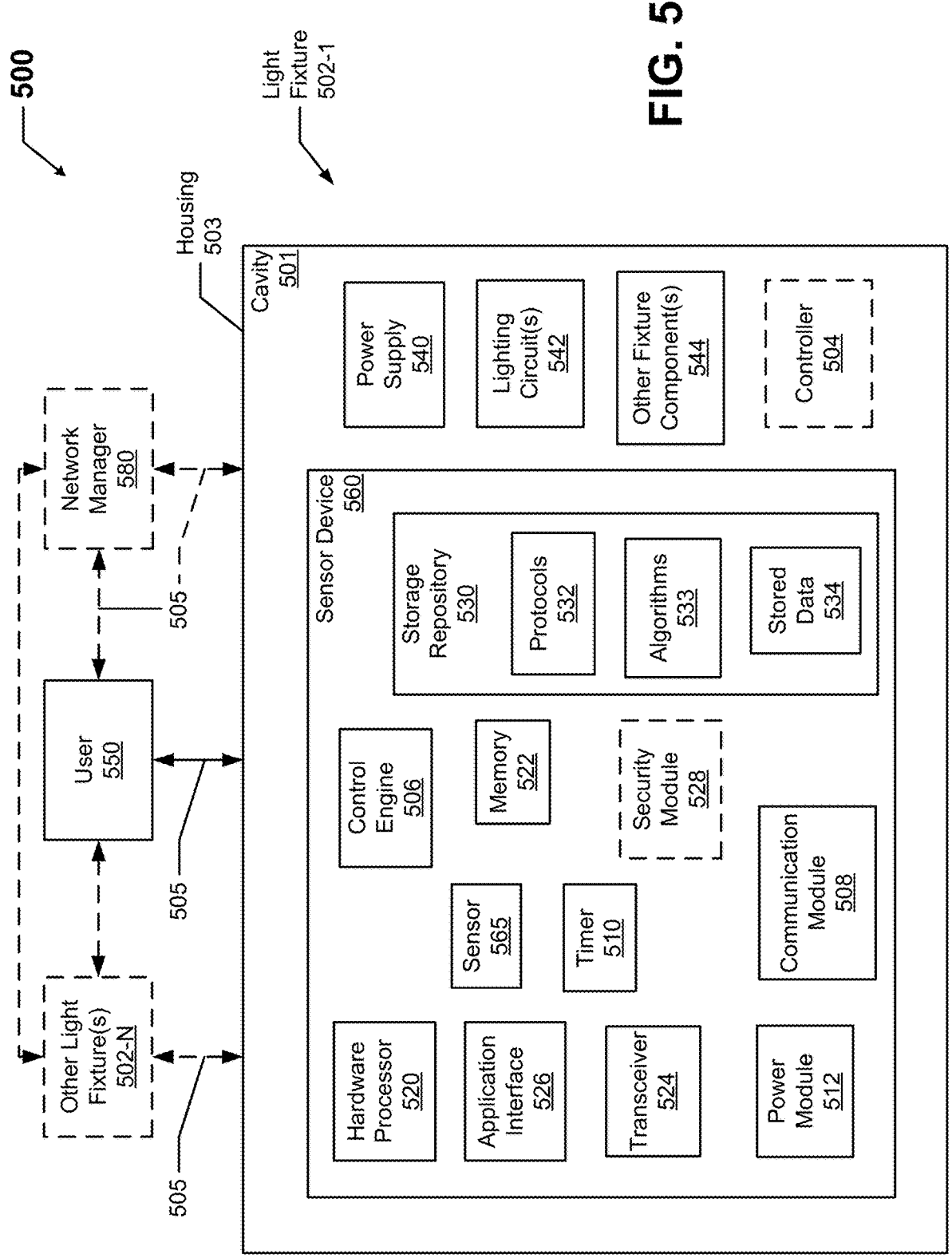
FIG. 5 shows a system diagram of another lighting system that includes a light fixture with a sensor in accordance with certain example embodiments.

FIG. 5 shows a system diagram of another lighting system 500 that includes a light fixture 502-1 having an example sensor device 560 in accordance with certain example embodiments. In this case, the controller 504 of the light fixture 502-1 is optional, and so the example sensor device 560 includes a number of capabilities of the controller 404 of FIG. 4 described above to allow the sensor device 560 to autonomously determine whether the light fixture 502-1 has experienced significant movement.

Referring to FIGS. 1 through 5, the lighting system 500 of FIG. 5 can include one or more users 550, an optional network manager 580, the light fixture 502-1, and one or more other optional light fixtures 502-N. In addition to the controller 504 and the sensor device 560, the light fixture 502-1 can include a power supply 540, one or more lighting circuits 542, and one or more other fixture components 544. The sensor device 560 can include one or more of a number of components. Such components, can include, but are not limited to, a sensor 565, a control engine 506, a communication module 508, a timer 510, a power module 512, a storage repository 530, a hardware processor 520, a memory 522, a transceiver 524, an application interface 526, and, optionally, a security module 528. The storage repository 530 can include one or more protocols 532, one or more algorithms 533, and stored data 534.

The various components shown in FIG. 5 can be substantially the same as the corresponding components shown in FIG. 4, except that the sensor 565, the control engine 506, the communication module 508, the timer 510, the power module 512, the storage repository 530, the hardware processor 520, the memory 522, the transceiver 524, the application interface 526, and, the optional security module 528 are part of the sensor device 560 rather than the optional controller 504.

If the light fixture 502-1 does include a controller 504, then the controller 504 can include a control engine, a communication module, a timer, a power module, a storage repository, a hardware processor, a memory, a transceiver, an application interface, an optional security module, and/or any other suitable component. In such a case, the components of the controller 504 can act independently of the corresponding components of the sensor device 560. Alternatively, one or more of the components of the sensor device 560 can be shared with the controller 504. In such a case, such a component can be located in a housing of the sensor device 560, on the housing of the sensor device 560, or outside the housing of the sensor device 560.

The light fixture 502-1 can include more than one sensor devices 560. In such a case, each additional sensor device 560 can include one or more of the components of the sensor device 560 shown in FIG. 5. In some cases, the components of one sensor device 560 can act independently of the corresponding components of another sensor device 560. Alternatively, one or more of the components of one sensor device 560 can be shared with another sensor device 560. The various components of the lighting system 500 of FIG. 5 are not exhaustive, and in some embodiments, one or more of the components shown in FIG. 5 may not be included in an example light fixture. Any component of the example light fixture 502-1 can be discrete or combined with one or more other components of the light fixture 502-1.

Figure 6:
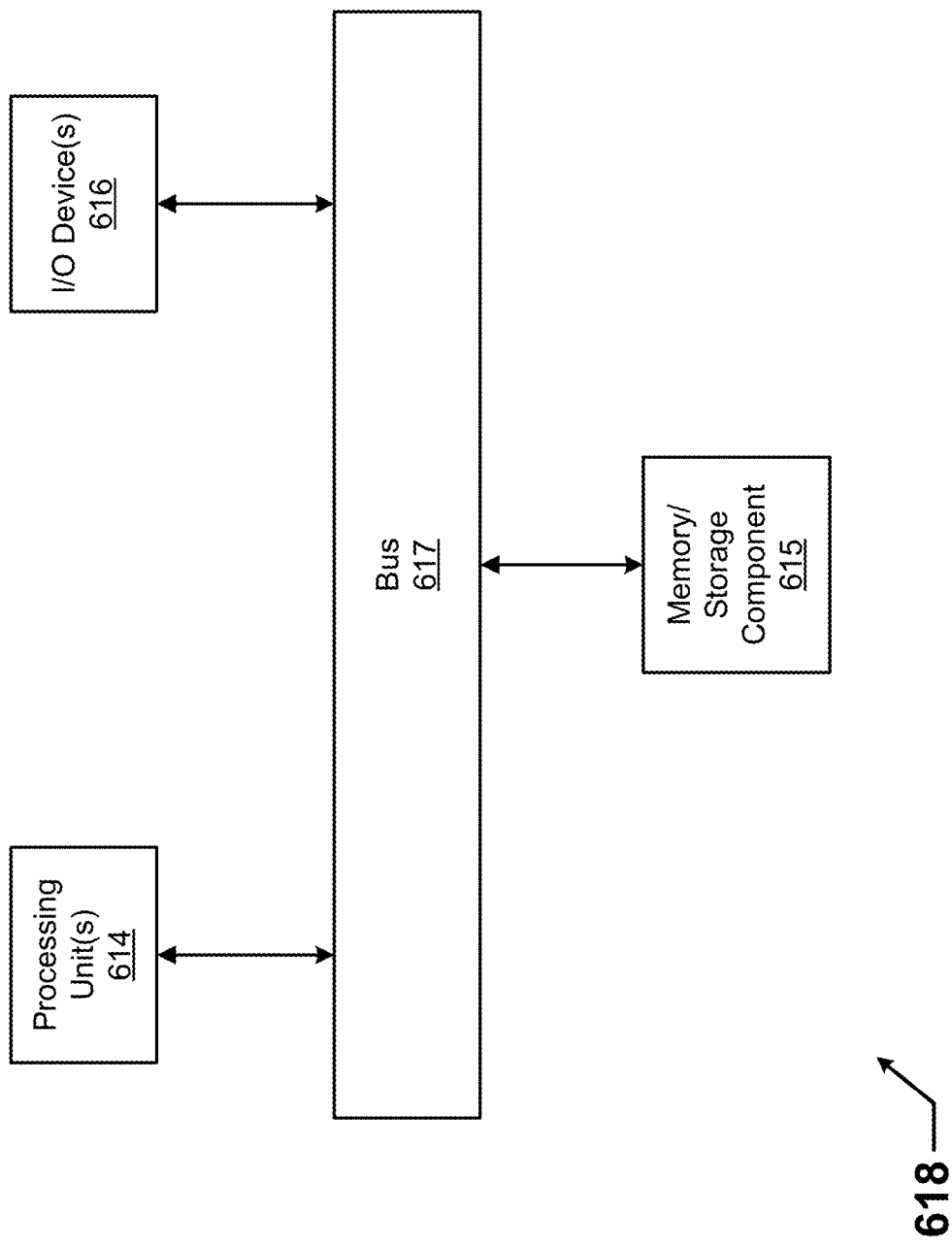
FIG. 6 shows a computing device in accordance with certain example embodiments.

FIG. 6 illustrates one embodiment of a computing device 618 that implements one or more of the various techniques described herein, and which is representative, in whole or in part, of the elements described herein pursuant to certain example embodiments. For example, computing device 618 can be implemented in the light fixture 402 of FIG. 4 in the form of the hardware processor 420, the memory 422, and the storage repository 430, among other components. As another example, computing device 618 can be implemented in the sensor device 560 of FIG. 5 in the form of the hardware processor 520, the memory 522, and the storage repository 530, among other components. Computing device 618 is one example of a computing device and is not intended to suggest any limitation as to scope of use or functionality of the computing device and/or its possible architectures. Neither should computing device 618 be interpreted as having any dependency or requirement relating to any one or combination of components illustrated in the example computing device 618.

Computing device 618 includes one or more processors or processing units 614, one or more memory/storage components 615, one or more input/output (I/O) devices 616, and a bus 617 that allows the various components and devices to communicate with one another. Bus 617 represents one or more of any of several types of bus structures, including a memory bus or memory controller, a peripheral bus, an accelerated graphics port, and a processor or local bus using any of a variety of bus architectures. Bus 617 includes wired and/or wireless buses.

Memory/storage component 615 represents one or more computer storage media. Memory/storage component 615 includes volatile media (such as random access memory (RAM)) and/or nonvolatile media (such as read only memory (ROM), flash memory, optical disks, magnetic disks, and so forth). Memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a customer, utility, or other user to enter commands and information to computing device 618, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments. Further, one or more embodiments is implemented on a distributed system having one or more nodes, where each portion of the implementation (e.g., control engine 406, control engine 506) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 7:
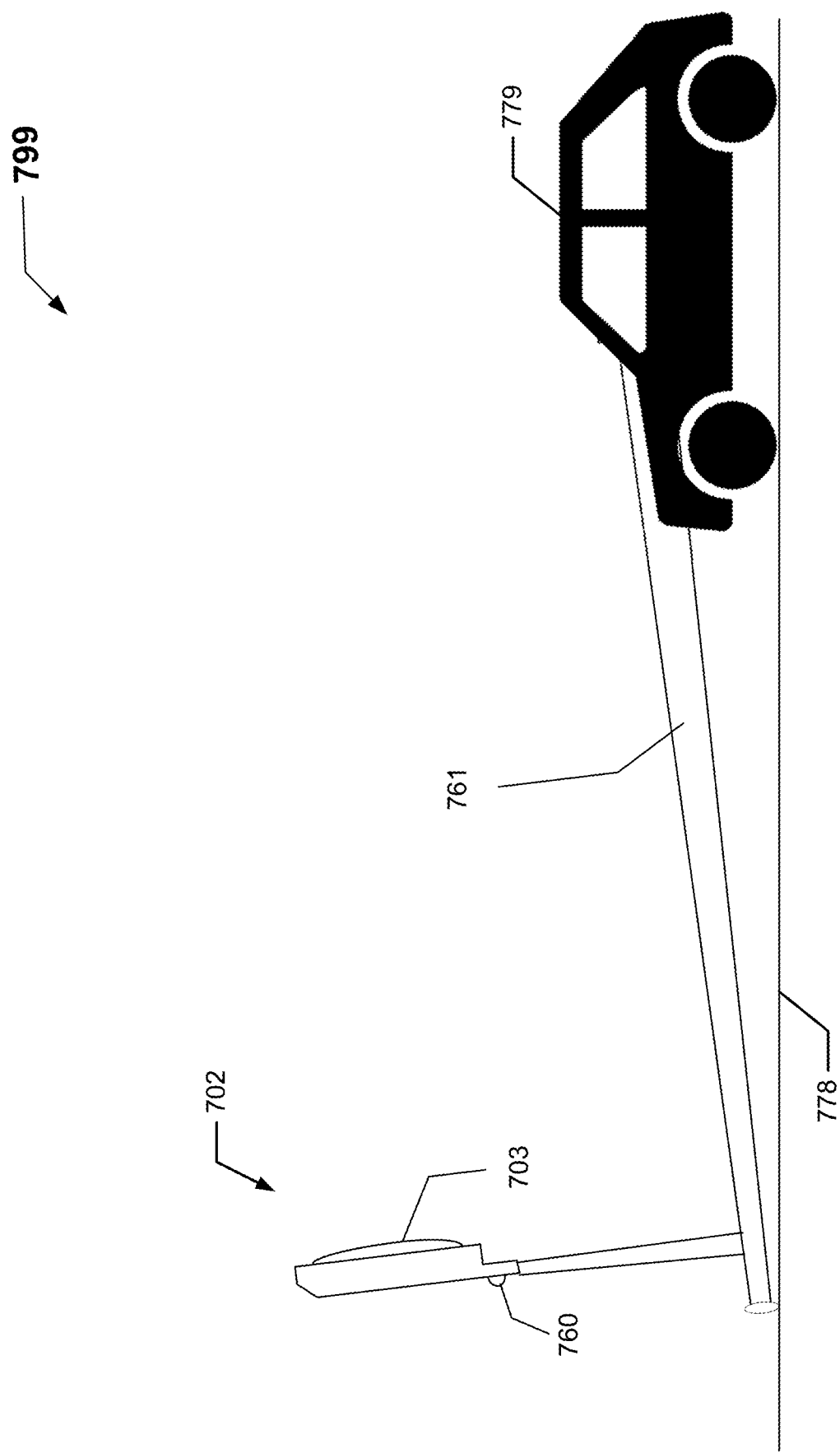
FIG. 7 shows a light fixture that has been knocked over in accordance with certain example embodiments.

FIG. 7 shows a scene 799 that includes light fixture 702 that has been knocked over by a car 779 in accordance with certain example embodiments. Referring to FIGS. 1 through 7, the light fixture 702 of FIG. 7 has components that are substantially the same as the light fixture 102 of FIG. 1. Specifically, the light fixture 702 of FIG. 7 includes a light fixture housing 703 that is mounted on a pole 761. The light fixture housing 703 has a sensor device 760 disposed thereon. The sensor device 760 includes a sensor in the form of a movement sensor (e.g., a gyroscope, an accelerometer, a magnetometer) that can be used to help determine the orientation of the light fixture 702 (or portion thereof) relative to some reference point (e.g., fully upright).

In this case, a car 779 has struck the pole 761, knocking the entire light fixture down to the ground 778. As a result, after one or more sensors of the sensor device 760 take one or more measurements after the light fixture 702 has been knocked to the ground 778, the controller (e.g., within the housing 703, of the sensor device 760) of the light fixture 702 can use one or more algorithms 433 and/or one or more protocols 432 to determine that the light fixture 702 has been knocked over. The controller can further send a communication to one or more users 450 as notification that the light fixture 702 needs to be replaced or otherwise put upright. In certain example embodiments, as discussed above with respect to FIG. 4, the sensor device 760 can receive power (at least long enough to send a signal communicating a measurement taken after threshold values have been exceeded) from the power module (e.g., power module 412), a battery, or some other source of power in the event that power from the power supply (e.g., power supply 440) is lost (e.g., power is interrupted as a result of the pole 761 being struck and knocked to the ground 778).

Figure 8:
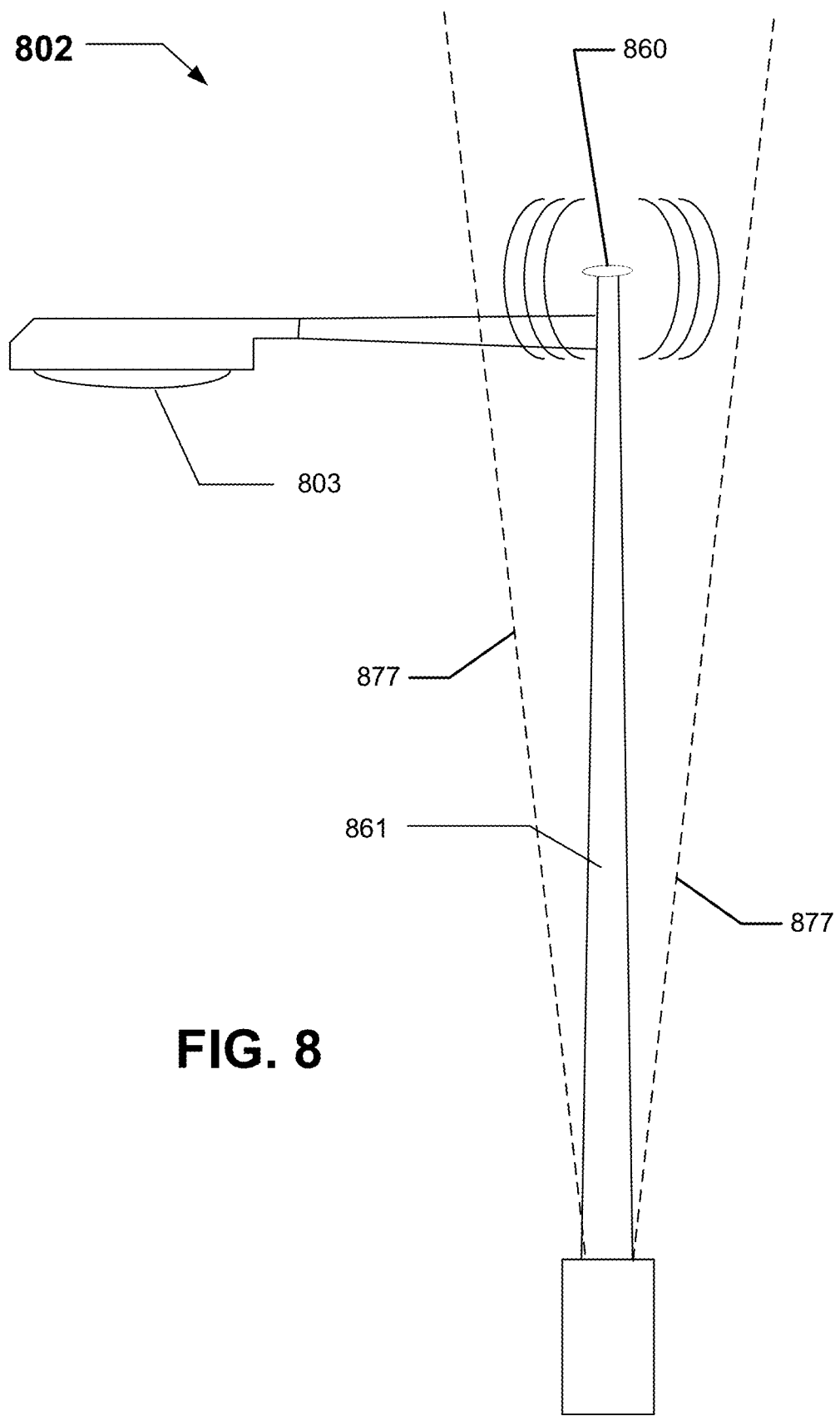
FIG. 8 shows a light fixture that is swaying in accordance with certain example embodiments.

FIG. 8 shows a light fixture that is swaying in accordance with certain example embodiments. Referring to FIGS. 1 through 8, the light fixture 802 of FIG. 8 has components that are substantially the same as the light fixture 102 of FIG. 1. Specifically, the light fixture 802 of FIG. 8 includes a light fixture housing 803 that is mounted on a pole 861. The sensor device 860 in this case is mounted atop the pole 861. The sensor device 860 includes a sensor in the form of a movement sensor (e.g., a gyroscope, an accelerometer, a magnetometer) that can be used to help determine the orientation of the light fixture 802 (or portion thereof) relative to some reference point (e.g., fully upright).

In this case, the light fixture 802 is remaining upright, but due to high winds, the housing 803 and the sensor device 860 are swaying at the top of the pole 861. As a result, the sensor device 860 (which in this case includes a sensor in the form of a movement sensor (e.g., a gyroscope, an accelerometer, a magnetometer)) measurements indicate movement of the sensor device 860 that deviates from the default (installed or fully upright) position. In this case, the controller (e.g., within the housing 803, of the sensor device 860) of the light fixture 802 can use one or more algorithms 433 and/or one or more protocols 432 to determine that if the swaying of the sensor device 860 is within a range 877 of acceptable values, then the controller will recognize that the light fixture 802 is merely swaying in the wind, and so is not knocked over.

Similarly, if a wind is sustained or extreme, the controller can use one or more algorithms 433 and/or one or more protocols 432 to determine that, when the sensor module 860 moves outside the range 877 of acceptable values, a timer (e.g., timer 411) should be started to determine if the sensor module 860 remains outside the range 877 of acceptable values for some minimal threshold period of time. If so, then the controller determines that the light fixture 802 has been knocked over. The controller can further send a communication to one or more users 450 as notification that the light fixture 802 needs to be replaced or otherwise put upright. Otherwise, the controller determines that the light fixture 802 is securely upright.

Figure 9:
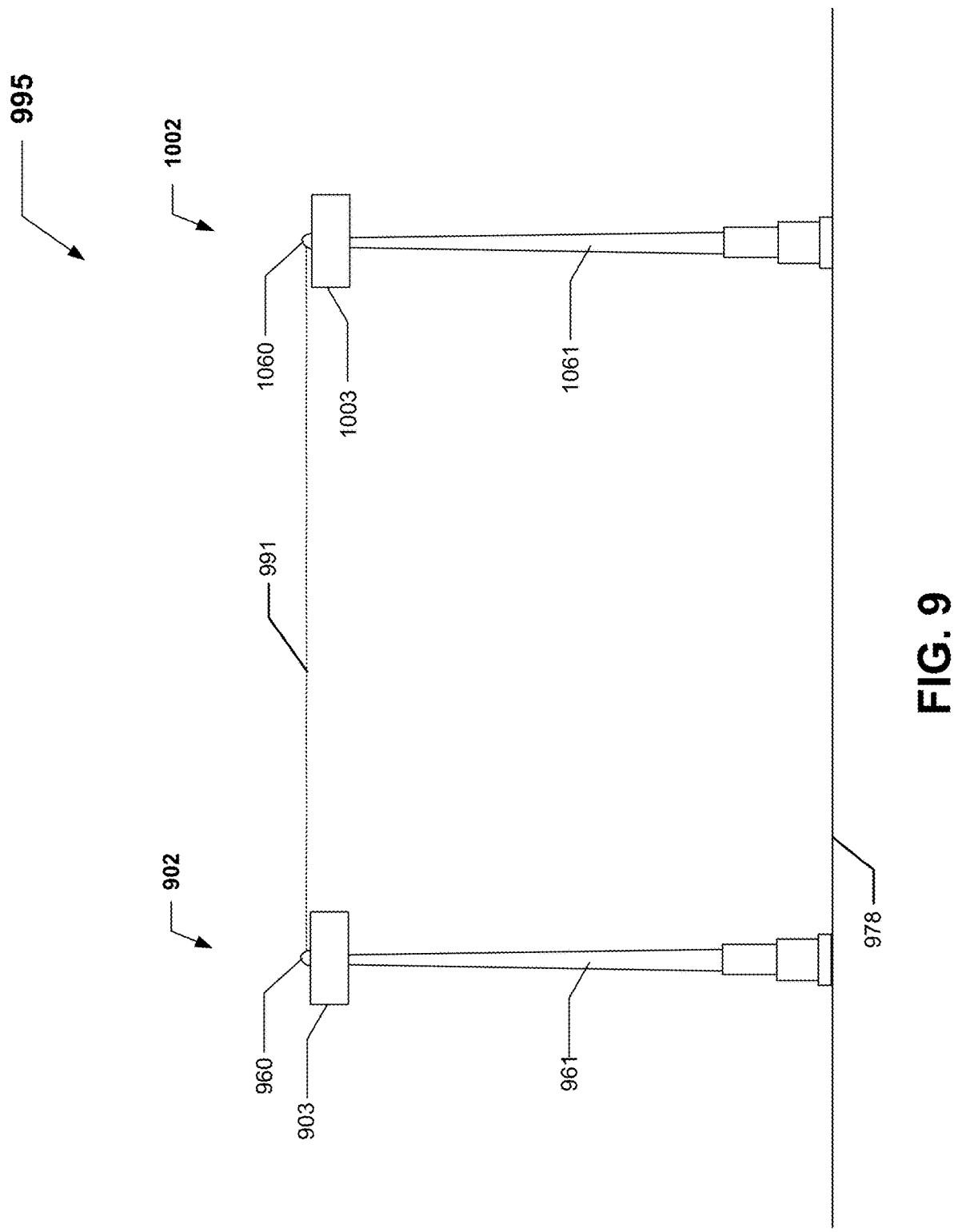
FIGS. 9 and 10 show an example of one light fixture monitoring the position of another light fixture in accordance with certain example embodiments.
Figure 10:
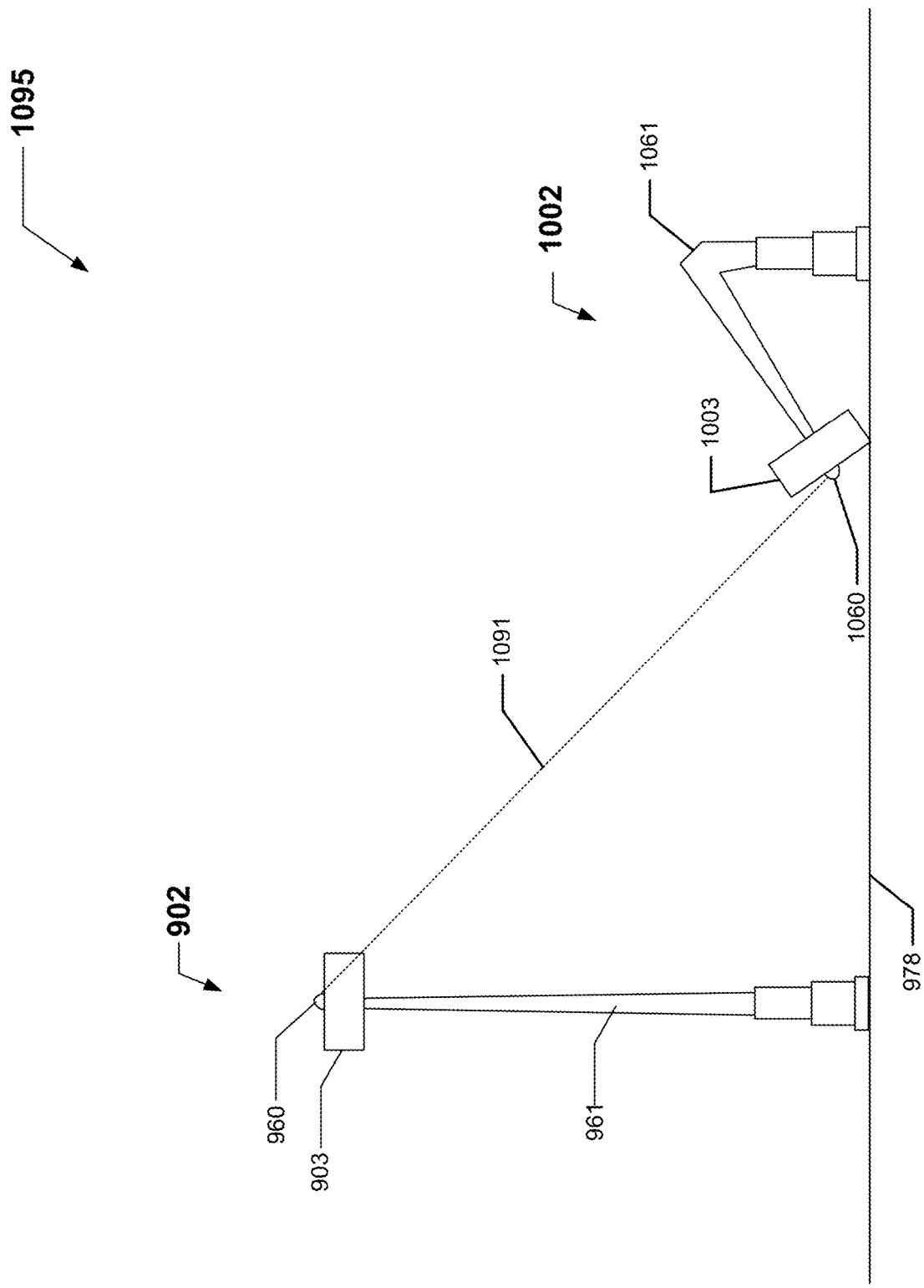

FIGS. 9 and 10 show an example of one light fixture monitoring the position of another light fixture in accordance with certain example embodiments. Referring to FIGS. 1 through 10, the system 995 of FIG. 9 includes two adjacent light fixtures mounted on poles in the ground 978 (in this case, a parking lot). Specifically, light fixture 902 includes a light fixture housing 903 that is mounted at the top of a pole 961, and light fixture 1002 includes a light fixture housing 1003 that is mounted at the top of a pole 1061. Sensor device 960 is mounted atop the housing 903 of light fixture 902, and sensor device 1060 is mounted atop the housing 1003 of light fixture 1002.

In this case, sensor device 960 and sensor device 1060 can each include at least one antenna that allow sensor device 960 and sensor device 1060 to communicate with each other. This communication can include RSSI, angle of arrival, and/or some other measurement associated with each communication signal 991 transmitted between sensor device 960 and sensor device 1060. Each communication signal 991 can also include a QUID so that the receiving sensor device can identify the sender of the communication signal 991. When light fixture 902 and light fixture 1002 are both upright, the measurement component (e.g., RSSI, angle of arrival) of each communication signal 991 between the sensor devices will be substantially consistent over time. The communication signals 991 are transmitted using communication links (e.g., communication links 105).

By contrast, as shown with the system 1095 of FIG. 10 where light fixture 902 remains upright while light fixture 1002 is knocked down to the ground 978. In such a case, assuming that sensor device 1060 is still capable of transmitting communication signals 1091 to sensor device 960, those communication signals 1091 will have substantially different measurement values (e.g., RSSI, angle of arrival) relative to those of communication signals 991. In this way, the controller (e.g., within the housing 903, of the sensor device 960) of the light fixture 902 can use one or more algorithms 433 and/or one or more protocols 432 to determine that the light fixture 1002 has fallen over based on the different measurement values of the communication signals 1091.

Example embodiments use at least one sensor device to measure parameters that indicate whether one or more light fixtures have been knocked down or otherwise damaged. Example embodiments can also notify one or more users as to a downed or damaged light fixture so that the light fixture can be repaired or replaced. Example embodiments can work with any type of light fixture, such as pole-mounted light fixtures used in parking lots, on highways, and in parks. The sensor devices used with example embodiments can be operationally independent or integrated with a controller of a light fixture. Example embodiments can be used to monitor a single light fixture or multiple light fixtures. Example embodiments provide a number of benefits. Such benefits can include, but are not limited to, increased reliability of the light fixture, more timely notification of downed light fixtures, improved efficiency of maintenance and repair of the light fixture, retrofitability with existing light fixtures, ease of maintenance, and compliance with industry standards that apply to light fixtures.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture for monitoring the position of another light fixture, the light fixture comprising:
    a housing;
    a plurality of antennas, wherein each antenna of the plurality of antennas is configured to receive a communication signal from the another light fixture mounted in a fixed location; and
    a controller coupled to the plurality of antennas, wherein the controller is configured to:
        determine an angle of arrival for the communication signal received by each of the plurality of antennas;
        determine that the angle of arrival falls outside a range of expected values that is established based on prior angle of arrival values associated with prior communication signals received by the plurality of antennas and broadcast by the another light fixture;
        determine, over a period of time, that the another light fixture is not temporarily out of the fixed position; and
        send, after ensuring that the another light fixture is not temporarily out of the fixed position, a notification to communicate that the another light fixture has changed position from the fixed location.

2. The light fixture of claim 1, wherein the housing is mounted on a pole.

3. The light fixture of claim 2, wherein the plurality of antennas is disposed on the pole separate from the housing.

4. The light fixture of claim 1, wherein the controller is further configured to:
    determine an additional angle of arrival for an additional communication signal received by each of the plurality of antennas and sent by an additional light fixture;
    determine that the additional angle of arrival received by the plurality of antennas falls outside an additional range of expected values that is established based on prior additional angle of arrival values associated with prior additional communication signals received by the plurality of antennas and broadcast by the additional light fixture; and
    send an additional notification to communicate that the additional light fixture has changed position from an additional fixed location.

5. The light fixture of claim 1, further comprising a sensor device that indicates whether the housing has moved to another position from its own fixed location.

6. The light fixture of claim 1, wherein the prior communication signals are received from the another light fixture over a period of time.

7. The light fixture of claim 1, wherein the plurality of antennas is disposed on the housing.

8. The light fixture of claim 1, wherein the controller automatically determines the angle of arrival for each communication signal received by the plurality of antennas.

9. The light fixture of claim 1, wherein the controller is disposed within the housing.

10. The light fixture of claim 1, wherein the controller is further configured to:
 determine that the additional light fixture has been knocked over.

11. A lighting system used to monitor the position of light fixtures, the lighting system comprising:
 a first light fixture comprising:
  a first housing mounted in a fixed location; and
  a transmitter that sends communication signals; and
 a second light fixture comprising:
  a second housing;
  at least one antenna that receives the communication signals transmitted by the transmitter; and
  a controller coupled to the at least one antenna, wherein the controller:
   determines a signal strength for each of the communication signals transmitted by the transmitter;
   determines that the signal strength of one of the communication signals received by the at least one antenna from the first light fixture at a first time falls outside a range of expected values that is established based on prior signal strength values associated with prior communication signals received by the at least one antenna and broadcast by the first light fixture prior to the first time, wherein the signal strength of the one of the communication signals falling outside the range of expected values indicates that the first housing of the first light fixture has changed position from the fixed location;
   determines, over a period of time after the first time, that the first housing of the first light fixture is not temporarily out of the fixed position; and
   sends, after confirming that the first housing of the first light fixture is not temporarily out of the fixed position, a notification to communicate that the first housing of the first light fixture has changed position from the fixed location.

12. The lighting system of claim 11, further comprising:
 a third light fixture comprising:
  a third housing mounted in another fixed location; and
  an additional transmitter that sends additional communication signals,
  wherein the at least one antenna of the second light fixture further receives the additional communication signals transmitted by the additional transmitter,
 wherein the controller further:
  determines an additional signal strength for each of the additional communication signals transmitted by the additional transmitter;
  determines that the additional signal strength of one of the communication signals received by the at least one antenna from the third light fixture at a second time falls outside an additional range of expected values that is established based on prior additional signal strength values associated with prior additional communication signals received by the at least one antenna and broadcast by the third light fixture prior to the second time; and
  sends an additional notification to declare that the third housing of the third light fixture has changed position from the another fixed location.

13. The lighting system of claim 11, wherein the first light fixture and the second light fixture are adjacent to each other along a roadway.

14. The lighting system of claim 11, wherein the first light fixture and the second light fixture are adjacent to each other.

15. A device for monitoring the position of a light fixture, the device comprising:
 at least one antenna coupled to another light fixture, wherein each of the at least one antenna is configured to receive a communication signal from the light fixture mounted in a fixed location; and
 a controller coupled to the at least one antenna, wherein the controller is configured to:
  determine an angle of arrival for the communication signal received by the at least one antenna;
  determine that the angle of arrival falls outside a range of expected values that is established based on prior angle of arrival values associated with prior communication signals received by the at least one antenna and broadcast by the light fixture; and
  send, after determining over a period of time that the light fixture has permanently changed position from the fixed location, a notification to communicate that the light fixture has changed position from the fixed location.

16. The sensor device of claim 15, further comprising:
 a transmitter coupled to the controller, wherein the transmitter sends the notification.

17. The device of claim 15, further comprising:
 a reserve power source that provides power to the controller when a primary source of power is interrupted.

18. The lighting system of claim 11, wherein the first housing of the first light fixture is temporarily out of the fixed position due to a natural event.

19. The lighting system of claim 18, wherein the natural event comprises vibrations from an earthquake.

20. The lighting system of claim 18, wherein the natural event comprises wind.

* * * * *